US008464585B2

(12) United States Patent
Raman et al.

(10) Patent No.: US 8,464,585 B2
(45) Date of Patent: Jun. 18, 2013

(54) COMBINED MEMS ACCELEROMETER AND GYROSCOPE

(75) Inventors: Johan Raman, Ghent (BE); Pieter Rombouts, Ghent (BE)

(73) Assignees: Melexis Technologies NV, Tessenderlo (BE); Universiteit Gent, Ghent (BE)

( * ) Notice: Subject to any disclaimer, the term of this patent is extended or adjusted under 35 U.S.C. 154(b) by 352 days.

(21) Appl. No.: 12/738,504

(22) PCT Filed: Oct. 20, 2008

(86) PCT No.: PCT/IB2008/002798
§ 371 (c)(1),
(2), (4) Date: Aug. 16, 2010

(87) PCT Pub. No.: WO2009/050578
PCT Pub. Date: Apr. 23, 2009

(65) Prior Publication Data
US 2010/0307241 A1    Dec. 9, 2010

(30) Foreign Application Priority Data
Oct. 18, 2007  (GB) .................................. 0720412.6

(51) Int. Cl.
*G01C 19/56*  (2012.01)
(52) U.S. Cl.
USPC ..................................... 73/504.12; 73/504.04
(58) Field of Classification Search
USPC .............. 73/504.03, 504.04, 504.12, 504.14, 73/510, 511, 514.01, 514.02
See application file for complete search history.

(56) References Cited

U.S. PATENT DOCUMENTS

| 5,392,650 | A  | * | 2/1995 | O'Brien et al. | ............ 73/514.18 |
| 5,894,091 | A  | * | 4/1999 | Kubota | ....................... 73/504.12 |
| 6,837,107 | B2 | * | 1/2005 | Geen | .......................... 73/504.04 |
| 6,845,665 | B2 | * | 1/2005 | Geen | .......................... 73/504.04 |
| 6,848,304 | B2 | * | 2/2005 | Geen | .......................... 73/504.04 |

(Continued)

OTHER PUBLICATIONS

Ardalan, S. H. et al., "An analysis of nonlinear behavior in delta-sigma modulators," IEEE Transactions on Circuits and Systems, vol. 34, pp. 593-603, Jun. 1987.

(Continued)

*Primary Examiner* — Helen Kwok
(74) *Attorney, Agent, or Firm* — Leydig, Voit & Mayer, LLP; Gerald T. Gray

(57) ABSTRACT

A MEMS structure for a combined gyroscope and accelerometer unit (100) based on in-plane vibratory movements comprises a proof mass (101) and comb-drives (102) operable to cause the proof mass (101) to resonate in the x-direction, commonly referred to as the primary mode. Under the influence of a rotation $\Omega_z$ around the z-axis, a Coriolis force acting in the y-direction results. This excites the secondary (or sense) mode. A set of parallel-plate capacitors 103 are provided to enable position readout along the secondary axis. In addition to the above, the comb-drive capacitors (102) of the primary mode can also be used for readout of position along the primary axis, and the parallel-plate capacitors (103) for actuation along the secondary axis. This can be achieved either by time-multiplexing these capacitors (102, 103) or by providing separate sets of capacitors (102, 103) for sensing and actuation along each axis. The unit can operate in separate $\Sigma\Delta$ force-feedback loops with respect to both axes. This force-feedback approach is already known for readout of the secondary mode of MEMS gyroscopes. It has not previously been applied to the primary mode of a gyroscope for the measurement of a component of acceleration.

29 Claims, 5 Drawing Sheets

U.S. PATENT DOCUMENTS

| | | | | |
|---|---|---|---|---|
| 7,302,847 | B2* | 12/2007 | Ito et al. | 73/504.14 |
| 7,765,869 | B2* | 8/2010 | Sung et al. | 73/504.04 |
| 7,950,281 | B2* | 5/2011 | Hammerschmidt | 73/504.04 |
| 8,113,050 | B2* | 2/2012 | Acar et al. | 73/504.04 |
| 8,117,912 | B2* | 2/2012 | Kawakubo et al. | 73/504.03 |

OTHER PUBLICATIONS

Dong, Y. et al., "A high-performance accelerometer with a fifth-order ΣΔ modulator," J. Micromechanics and Microengineering, vol. 15, No. 7, pp. 22-29, Jul. 2005.

Jiang, X. et al., "ΣΔ capacitive interface for a vertically-driven X&Y-axis Rate Gyroscope," in Proc. European Solid-State Circuits Conference (ESSCIRC), pp. 639-642, Sep. 2002.

Jiang, X. et al., "A monolithic surface micromachined Z-axis gyroscope with digital output," in Symp. on VLSI Circuits Dig. Tech. Papers, Honolulu, pp. 16-19, 2000.

Kajita, T. et al., "A two-chip interface for a MEMS accelerometer," IEEE Transactions on Instrumentation and Measurement, vol. 51, No. 4, pp. 853-858, Aug. 2002.

Kraft, M. et al., "Closed loop micro-machined sensors with higher order ΣΔ modulators," in Proc. 4th Conf. Modeling and Simulation of Microsystems, Hilton Head, pp. 100-103, Mar. 2001.

Kranz, M. et al., "A wide dynamic range silicon-on-insulator MEMS gyroscope with digital force feedback," in 12th International Conference on Transducers, Solid-State Sensors, Actuators and Microsystems, pp. 159-162, 2003.

Külah, H. et al., "Noise analysis and characterization of a sigma-delta capacitive Microaccelerometer," IEEE J. of Solid-State Circuits, vol. 41, No. 2, pp. 352-361, Feb. 2006.

Lemkin, M. et al., "A three-axis micromachined accelerometer with a CMOS position-sense interface and digital offset-trim electronics," IEEE J. Solid-State, vol. 34, No. 4, pp. 456-468, Apr. 1999.

Petkov, V. P. et al., "High-order electromechanical ΣΔ modulations in micromachined inertial sensors," IEEE Transactions on Circuits and Systems—I: Fundamental Theory and Applications, vol. 53., No. 5, pp. 1016-1022, May 2006.

Petrov, V. P. et al., "A fourth-order ΣΔ interface for micromachined inertial sensors," IEEE J. of Solid-State Circuits, vol. 40, No. 8, pp. 1602-1609, Aug. 2005.

Raman, J. et al., "A digitally controlled MEMS gyroscope with unconstrained sigma-delta force-feedback architecture," in Proc. 19th IEEE Int. Conf. on Micro-Electromechanical Systems, pp. 710-713, Jan. 2006.

Raman, J. et al., "An unconstrained architecture for high-order sigma-delta force-feedback inertial sensors," in ISCAS Proc. 40th IEEE Int. Symposium on Circuits and Systems, pp. 3063-3066, 2007.

Traechtler, M. et al., "Novel 3-axis gyroscope on a single chip using SOI-technology," IEEE Sensors Conf., pp. 124-127, 2007.

* cited by examiner

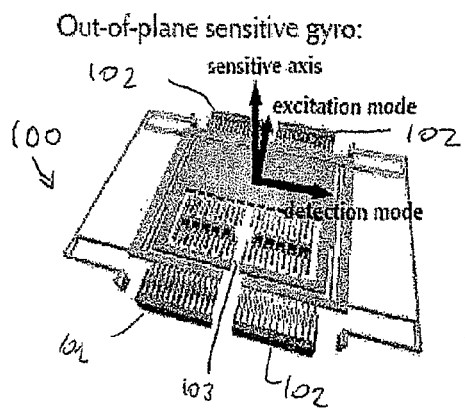
Fig 6a
Out-of-plane sensitive gyro:
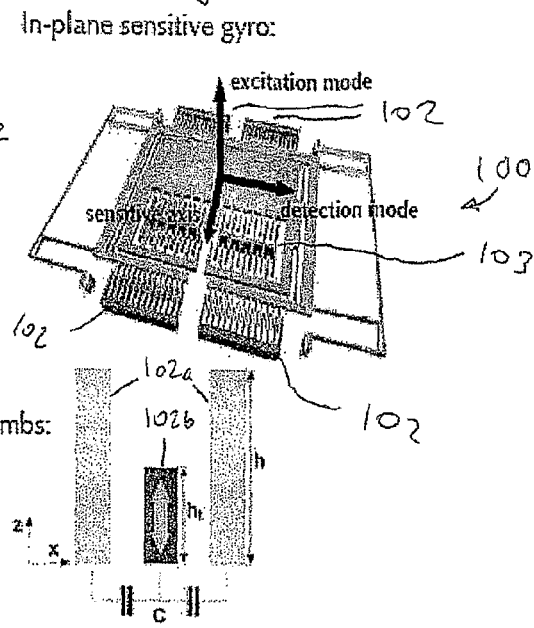
Fig 6b
In-plane sensitive gyro:
Sectional view of excitation combs: (in-plane sensitive gyro)
Fig 6c
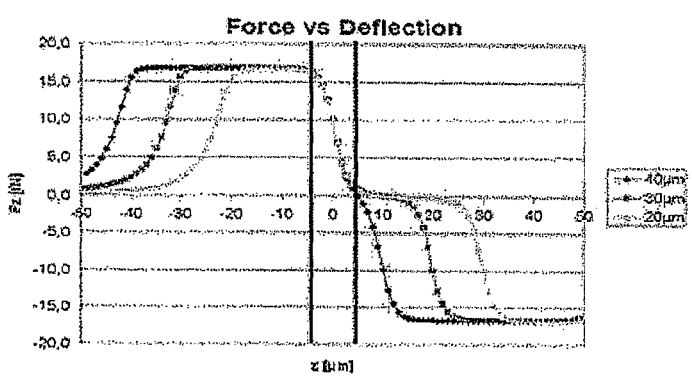
Fig 6d

COMBINED MEMS ACCELEROMETER AND GYROSCOPE

The present invention relates to a combined accelerometer and gyroscope and particularly to such a device sensing both acceleration and rotation using a single proof mass.

At the present time, there are a number of important applications for low-cost inertial measurement units (IMUs), for example in the automotive industry, where IMUs can improve the accuracy of GPS based navigation and serve as a backup during blank outs (e.g. in tunnels and areas with buildings or mountains blocking satellite reception). Typically, such low cost sensors incorporate MEMS (microelectromechanical systems) technology.

A simple MEMS structure accelerometer comprises a proof mass and means for measuring the deflection of the proof mass in relation to one or more axes.

A typical MEMS structure gyroscope comprises a proof mass and a plurality of actuating means (such as comb-drives) operable to cause the proof mass to resonate in the x-direction, commonly referred to as the primary mode. Under the influence of a rotation $\Omega_z$ around the z-axis, a Coriolis force acting in the y-direction results. This excites the secondary (or sense) mode. A set of parallel-plate capacitors (or other suitable sensing means) are provided to enable position readout along this direction.

In order to improve the accuracy of the readout of information relating to the secondary mode, a $\Sigma\Delta$ force-feedback loop can be used [1-11]. This can be achieved by time-multiplexing the capacitors so that they can be used both for sensing and actuation. Alternatively, the MEMS design can easily be adapted to have separate sets of secondary mode capacitors for sensing and actuation. A distinctive advantage of using force-feedback is that the dynamic range of the readout setup can be increased significantly, without a cost in terms of resolution. Especially for the sense mode of the gyroscope, this is relevant since it avoids saturation of the readout circuit due to large parasitic signals (e.g., the quadrature error). Also, the sensitivity to (temperature dependent) mechanical parameters is strongly reduced. An extra advantage of $\Sigma\Delta$ force-feedback is that the inherent voltage-to-force nonlinearity of the actuator is effectively dealt with. On top of this, also an implicit analogue-to-digital (A/D) conversion is provided.

In order to provide full coverage of all six degrees-of-freedom (DOF) in respect of acceleration and rotation, measurements need to be taken along three independent axes. In practice, a plurality of differently aligned sensors combined in sensor clusters are used. Clearly, the number of sensors that is needed has a direct impact on the cost. Therefore, a device which is operable to measure inertial forces over more than one degree of freedom based on a single mechanical structure may provide significant cost-savings.

It is an object of the present invention to provide a sensor operable to measure inertial forces over more than one degree of freedom.

According to a first aspect of the present invention there is provided a combined accelerometer and gyroscope unit comprising: a proof mass; primary actuating means operable to actuate the proof mass along a primary axis; secondary actuating means operable to actuate the proof mass along a secondary axis; secondary sensing means operable to sense the position of the proof mass along the secondary axis; and primary sensing means operable to sense the position of the proof mass along the primary axis wherein $\Sigma\Delta$ force-feedback loops are set up for both the secondary axis and the primary axis.

By monitoring the output of both $\Sigma\Delta$ force feedback loops, this provides a unit that is operable to measure separate components of both acceleration (along both the primary and the secondary axis) and rotation (around a third axis orthogonal to the primary and secondary one) with a single proof mass.

This invention provides a $\Sigma\Delta$ force-feedback loop around the primary mode of a gyroscope for measuring a component of acceleration which has not been disclosed or suggested previously. This when applied effectively provides the advantage that acceleration-type inertial forces can be measured along this direction while at the same time the proof mass is forced to move (which is needed for operation as a gyroscope) in a controlled way. Also, the sensitivity to (temperature dependent) mechanical parameters is strongly reduced. An extra advantage of $\Sigma\Delta$ force-feedback is that the inherent voltage-to-force nonlinearity of the actuator is effectively dealt with. On top of this, also an implicit analogue-to-digital (A/D) conversion is provided.

Additionally, since acceleration-type inertial forces and Coriolis type inertial forces are typically well separated in frequency, they can both be measured using the same proof mass without inducing significant error in either measurement. For instance, for accelerations, the primary axis vibrations (primary mode) typically lie in a band between DC and up to around 1 KHz, for normal conditions. In contrast, operation of a vibratory gyroscope involves only a small frequency band around the resonant frequency of the primary (driven) mode, which is typically above 5 KHz.

Preferably the accelerometer and gyroscope unit is a MEMS accelerometer and gyroscope unit.

Preferably, both the primary actuating means and the primary sensing means are comb-drive capacitors. Separate comb-drive capacitors may be provided for actuating and for readout. Alternatively, time multiplexing may be used to allow the same comb-drive capacitors to be utilised both for actuating and for readout.

Preferably, both the secondary actuating means and the secondary sensing means are differential parallel plate capacitors. Separate differential parallel plate capacitors may be provided for actuating and for readout. Alternatively, time multiplexing may be used to allow the same differential parallel plate capacitors to be utilised both for actuating and for readout.

Preferably separate $\Sigma\Delta$ force-feedback loops are provided for the primary mode and the secondary mode. The primary loop may have an extra input $V_{in}$. The extra input $V_{in}$ forces the proof mass to track a predefined movement.

Each loop may incorporate an electrical filter. The filters act to influence the noise-shaping properties of each loop by providing a high gain in the frequency-range of interest. At the end of each loop, a quantizer may be provided. The quantizer delivers digital output values. The digital output values control the application of a constant actuation voltage to the actuating means to produce a force-pulse during an interval $[\tau_1, \tau_2]$ in either the positive or the negative direction.

Each loop essentially contains a mechanical feedback path. In addition to each mechanical feedback path, an electrical feedback path can be provided. The electrical feedback loops may be provided with additional electrical filters. Preferably, each additional filter has the same poles as the first filters. Each additional filter may have different zeros to the first filters. Alternatively, if the electrical feedback loop is omitted, an extra controller filter is provided to stabilize the loop.

The unit may be further provided with tertiary actuating means operable to actuate the proof mass along a tertiary axis and/or tertiary sensing means operable to sense the position of the proof mass along the tertiary axis. Preferably, the tertiary axis is substantially perpendicular to the plane containing the primary and secondary axes.

Preferably, both the tertiary actuating means and the tertiary sensing means are comb-drive capacitors. Separate comb-drive capacitors may be provided for actuating and for readout. Alternatively, time multiplexing may be used to allow the same comb-drive capacitors to be utilised both for actuating and for readout.

The tertiary actuation and sensing may be provided by comb-drive capacitors orientated in a common manner to those used for the primary actuating means and the primary sensing means. In order to achieve this, the comb-drive capacitors used in the tertiary actuation and sensing may be adapted such that the two sets of fingers comprising the comb-drive capacitors are of differing dimensions along the tertiary axis. Alternatively, it is of course possible that the tertiary actuation and sensing means may be orientated in a common manner to the secondary actuating means and secondary sensing means.

Whilst the above has been described primarily in terms of a combined accelerometer and gyroscope operating with $\Sigma\Delta$ force-feedback loops for the both the secondary axis and the primary axis, the various features above may each be applicable to a combined accelerometer and gyroscope operating with a $\Sigma\Delta$ force-feedback loop along only one of these axes where appropriate or desired.

According to a second aspect of the present invention there is provided a sensor cluster comprising one or more combined accelerometer and gyroscope units according to the first aspect of the present invention.

The cluster according to the second aspect of the present invention may incorporate any or all features of the first aspect of the present invention as are desired or are appropriate. The cluster may additionally comprise one or more dedicated accelerometers or gyroscopes. Such other devices may be single axis or multi-axis as desired or as appropriate.

According to a third aspect of the present invention there is provided a method of operating a combined accelerometer and gyroscope unit having a proof mass; primary actuating means operable to actuate the proof mass along a primary axis; secondary actuating means operable to actuate the proof mass along a secondary axis; secondary sensing means operable to sense the position of the proof mass along the secondary axis; and primary sensing means operable to sense the position of the proof mass along the primary axis, the method comprising the steps of: setting up $\Sigma\Delta$ force-feedback loops for both the secondary axis and the primary axis to measure both a component of rotation and two components of acceleration.

The method according to the third aspect of the present invention may incorporate any or all features of the first or second aspects of the present invention as are desired or are appropriate.

In order that the invention is more clearly understood, it will be described in greater detail below, by way of example only, and with reference to the accompanying drawings in which:

FIG. 6a shows an adapted combined accelerometer and gyroscope of FIG. 1 used for sensing movement along a tertiary axis which lies out of the plane parallel to the primary and secondary axes;

FIG. 6b shows an adapted combined accelerometer and gyroscope of FIG. 1 used for driving movement along a tertiary axis which lies out of the plane parallel to the primary and secondary axes;

FIG. 6c is a cross-sectional view of an adapted comb-drive capacitor used for actuating and/or sensing along both primary and tertiary axes;

FIG. 6d is a plot indicating the variation in force experienced by the comb-drive fingers as a function of their deflection along the tertiary axis for various finger separations.

Figure 1:
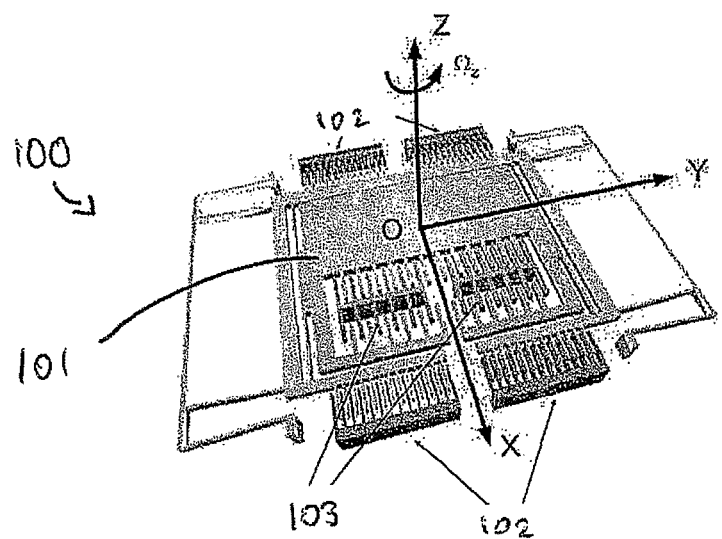
FIG. 1 is a schematic diagram of a MEMS structure suitable for use as a combined accelerometer and gyroscope according to the present invention.

Turning first to FIG. 1, a schematic example of a MEMS structure for a combined gyroscope and accelerometer unit 100 based on in-plane vibratory movements is shown. The combined unit 100 comprises a proof mass 101 and comb-drives 102 operable to cause the proof mass 101 to resonate in the x-direction, commonly referred to as the primary mode. Under the influence of a rotation $\Omega_z$ around the z-axis, a Coriolis force acting in the y-direction results. This excites the secondary (or sense) mode. A set of parallel-plate capacitors 103 are provided to enable position readout along the secondary axis. In addition to the above, the comb-drive capacitors 102 of the primary mode can also be used for readout of position along the primary axis, and the parallel-plate capacitors 103 for actuation along the secondary axis. This can be achieved either by time-multiplexing these capacitors 102, 103 or by providing separate sets of capacitors 102, 103 for sensing and actuation along each axis.

When both axes are provided with both sensing and actuation functions, the unit can operate in separate $\Sigma\Delta$ force-feedback loops with respect to both axes. This force-feedback approach is already known for readout of the secondary mode of MEMS gyroscopes. It has not previously been applied to the primary mode of a gyroscope for the measurement of a component of acceleration.

An advantage of using force-feedback is that the dynamic range of the readout setup can be increased significantly, without a cost in terms of resolution. Especially for the sense mode of the gyroscope, this is relevant since it avoids saturation of the readout circuit due to large parasitic signals (e.g., the quadrature error). Also, the sensitivity to (temperature dependent) mechanical parameters is strongly reduced. An extra advantage of $\tau\Delta$ force-feedback is that the inherent voltage-to-force nonlinearity of the actuator is effectively dealt with. On top of this, also an implicit analogue-to-digital (A/D) conversion is provided.

Figure 2:
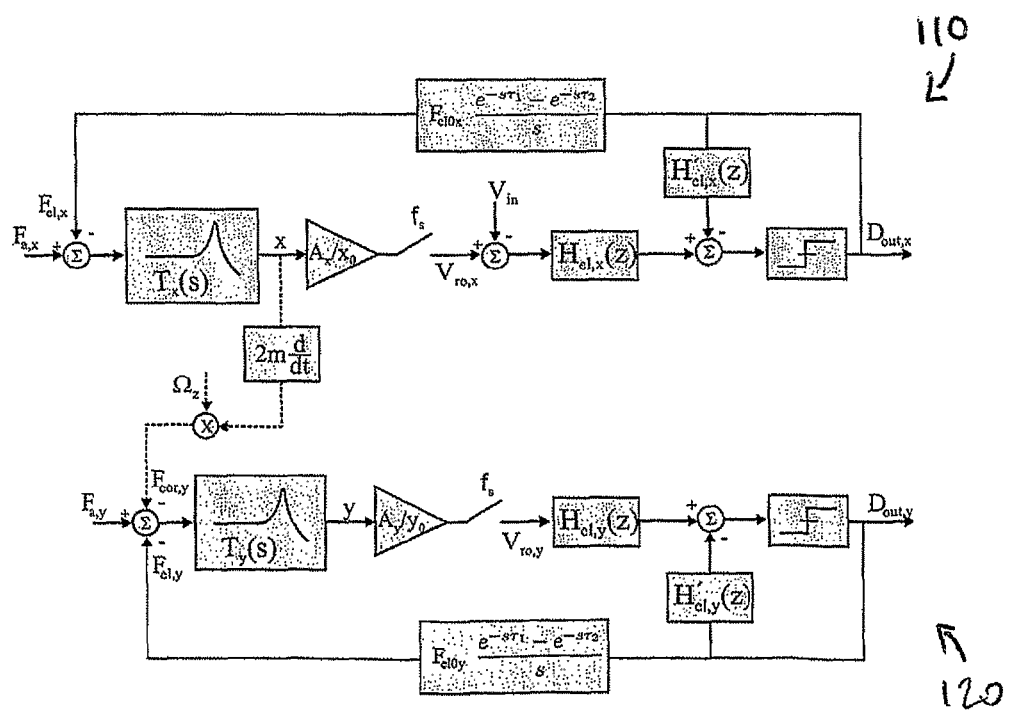
FIG. 2 is a block diagram of the $\Sigma\Delta$ force-feedback loops for measuring both a component of acceleration and a component of rotation using the apparatus of FIG. 1.

Turning now to FIG. 2, the schematic operation of each $\Sigma\Delta$ force-feedback loop is illustrated leading to separate measurement of two acceleration components (along both the primary and secondary axes) and one rotational component (around an axis orthogonal to the primary and secondary axes). In FIG. 2, the upper part of the figure describes the primary mode loop 110 and the lower part of the figure describes the secondary mode loop 120. The transfer functions $T_x(s)$, $T_y(s)$ represent the second-order damped mass-spring oscillations of the primary mode and secondary mode respectively. The forces acting upon the proof mass 101 are the acceleration-type forces denoted as $F_{a,x}$ and $F_{a,y}$, the electrostatic (feedback) forces $F_{el,x}$ and $F_{el,y}$, and the Coriolis force $F_{cor,y}$. The outputs of the readout circuits (connected to sensing capacitors 102, 103 to determine the displacements x and y of the proof mass) are modelled here as simple gains $A_x/x_0$, $A_y/y_0$. After sampling at a rate $f_s$ the discrete-time output signals $V_{ro,x}$ and $V_{ro,y}$ are obtained for the primary and secondary modes respectively. At this point there is a significant difference between the primary loop 110 and the secondary loop 120, in that the primary-mode loop 110 has an extra input $V_{in}$. The extra input $V_{in}$ forces the proof mass 101 to track a predefined movement, as will be explained in greater detail below.

The next step in each loop 110, 120 is the provision of an electrical filter $H_{el,x}$, $H_{el,y}$. The primary purpose of the filters $H_{el,x}$, $H_{el,y}$ is to influence the noise-shaping properties of each loop 110, 120 by providing a high gain in the frequency-range of interest.

At the end of each loop, a quantizer is provided, delivering the digital output values $D_{out,x}$, $D_{out,y}$. Depending on these digital values $D_{out,x}$, $D_{out,y}$, a constant actuation voltage is applied to the respective actuation capacitor 102, 103 to produce a force-pulse during an interval $[\tau_1, \tau_2]$ in either the positive or the negative direction.

In each loop 110, 120 in addition to the mechanical feedback there is also electrical feedback. For this reason, this $\Sigma\Delta$ force-feedback architecture can be categorised as a mixed-feedback architecture. The electrical feedback paths are provided with additional filters $H'_{el,x}(z)$, $H'_{el,y}(z)$ respectively. Each additional filter $H'_{el,x}(z)$, $H'_{el,y}(z)$ has the same poles as $H_{el,x}(z)$, $H_{el,y}(z)$ but may have different zeros. In a preferred embodiment, both filters H and H' share the same states, but have different feed-in coefficients.

By appropriate design, mixed feedback architectures do not have any constraints with respect to the noise transfer functions (NTF) that can be realized. This allows a straight-forward design strategy [12]. For this reason, such mixed feedback architectures are preferable to architectures with only mechanical feedback.

Hereinbelow this explanation will focus only on the primary mode loop 110, since the use of a $\Sigma\Delta$ force-feedback loop for the secondary mode is known [1-11]. Because the explanation relates solely to the primary mode, in what follows the subscript x will be left out.

First consider the primary loop 110 when $V_{in}$ is substantially zero. It is clear that an in-plane force (e.g., due to accelerations) acting upon the proof mass 101 will be sensed and counteracted by a feedback force, at least when the loop 110 gain is high enough at the frequencies where these external forces occur. The total system then behaves as two independent closed-loop accelerometers.

Now consider the primary-mode loop 110, assuming that $V_{in}$ is non-zero signal. The purpose of $V_{in}$ is to initiate a large movement along the primary mode axis. Because of the fairly low actuation forces that can be generated by the comb-drives 102, this requires actuating the proof mass 101 close to resonance. Also, the quality factor of this mode should be fairly high, typically at least 100.

Assuming $V_{in}$ to be a sinusoidal signal close to the resonant frequency, we can argue that the loop 110 consisting of the mechanical transfer and the electrical filter $H_{el}(z)$ has a very high gain for this frequency. Therefore, following an intuitive reasoning based on a nullator operation of the loop 110, the loop 110 will try to generate a signal $V_{ro}$ which cancels $V_{in}$. Because $V_{in}$ is actually subtracted from the readout signal, the loop tries to make $V_{ro} \approx V_{in}$. Since the primary mode makes use of comb-fingers 102, the readout transfer relating the displacement x to the output voltage $V_{ro}$ is linear. Therefore, under the mentioned conditions, the extra input $V_{in}$ directly determines the x-position of the proof mass 101.

In order to make the above intuitive results more rigorous, we proceed by determining some transfer functions involved. Based on a linearised quantizer model [13], the following expression for $D_{out}$ and $V_{ro}$ can be derived:

$$D_{out}(z) = G_n H_{el}(z) NTF_q(z) V_{in}(z) + NTF_q(z) Q(z) \quad (1)$$

$$V_{ro}(z) = \frac{G_n H_{el}(z) T_d(z)}{1 + G_n H_{el}(z) T_d(z) + G_n H'_{el}} V_{in}(z) + T_d(z) NTF_q(z) Q(z) \quad (2)$$

In this, $NTF_q = \dfrac{1}{1 + G_n(H_{el,x}(z) T_d(z) + H'_{el,x}(z))}$ denotes the quantization noise transfer function, $G_n$ represents the quantizer gain, and $T_d(z)$ stands for the equivalent discrete-time transfer function from the (digital) actuation input to the sample readout voltage.

Now each of the terms in the above expressions (1) and (2) will be considered separately. The second term in expression (1) is the simplest to explain. It represents the shaped quantization noise, which is always present in a $\Sigma\Delta$ system. As in any $\Sigma\Delta$ loop, the transfer $NTF_q$ representing the quantization noise shaping is an important property. In the proposed $\Sigma\Delta$ force-feedback loop, $NTF_q$ should be designed to provide good performance in the frequency ranges for acceleration sensing and also around the resonant frequency for gyroscopic operation. The response of the mechanical system to this shaped quantization noise can also be found in $V_{ro}(z)$ (in the second term). At first one might expect that the quantization noise gets amplified near the resonant frequency, but this effect is counteracted by the notch in the noise-shaping function $NTF_q$.

Turning now to the first term in expression (2). It can be argued that for frequencies where the mechanical path dominates, the denominator of the transfer function involved is dominated by the term $G_n H_{el}(z) T_d(z)$. Since the same expression appears in the numerator, the approximation $$V_{ro}(z) \approx V_{in}(z) + T_d(z) NTF_q(z) Q(z)$$

applies. In this, the second term represents the response of the mechanical system to quantization noise, which can be neglected compared to the first term. Therefore, we have the approximation $V_{ro}(z) \approx V_{in}(z)$ which implies that the proof mass movement is mainly determined by the input signal $V_{in}$. Referring now again to the expression (1), we also expect to see a driving signal to appear in $D_{out}$ (located at the driving frequency).

In order to illustrate the potential of the presented technique, an actual possible design has been presented purely as an example. In this explanation of the example design, the focus once again remains purely on the primary mode, since the use of a $\Sigma\Delta$ force-feedback loop for the secondary mode can be considered known. After calculation, the equivalent discrete-time mechanical transfer function $T_d(z)$ is given as:

$$Td(z) = 1.7417 * 10^{-5} \frac{z+1}{z^2 - 1.983z + 0.9988}$$

The target noise shaping has a zero at the mechanical resonant frequency and at DC. Together with the second-order mechanical transfer, we arrive at a fifth-order $\Sigma\Delta$ system. Using a systematic design strategy as in [12], the electrical filters $$H_{el}(z) = 155.8671 \frac{z - 1.034}{(z-1)(z^2 - 1.984z + 1)}$$

$$H'_{el}(z) = 0.79191 \frac{z^2 - 1.64z + 0.7138}{(z-1)(z^2 - 1.984z + 1)}$$

are determined. Next, a Simulink model has been build for the $\Sigma\Delta$ force-feedback loop. In this, the driving input $V_{in}$ was taken at the resonant frequency of the mechanical transfer. The amplitude of this driving signal ramps-up to a maximal level where the loop 110 remains stable. Also, an extra acceleration signal has been introduced, localized at a 20 times lower frequency.

Figure 3:
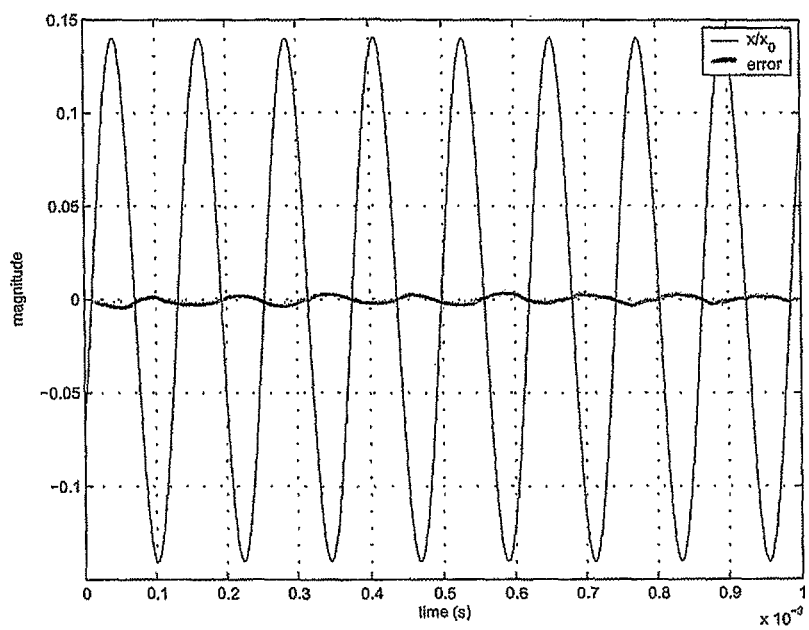
FIG. 3 illustrates the use of the $\Sigma\Delta$ force-feedback loop for driving the primary mode of the apparatus of FIG. 1, showing both the normalised position along the primary axis ($x/x_0$) and error between the normalised position and the input control signal.

A time-domain plot of the normalized movement ($x/x_0$) of proof mass 101 along the primary axis x (after ramp-up) is shown in FIG. 3. The sinusoidal movement of the proof mass 101 is apparent, proving that driving is actually taking place. Also, the error between the normalized position ($x/x_0$) and the input control signal is displayed. The error is approximately 38.45 dB below the wanted movement, indicating the excellent tracking behaviour at this frequency.

Figure 4:
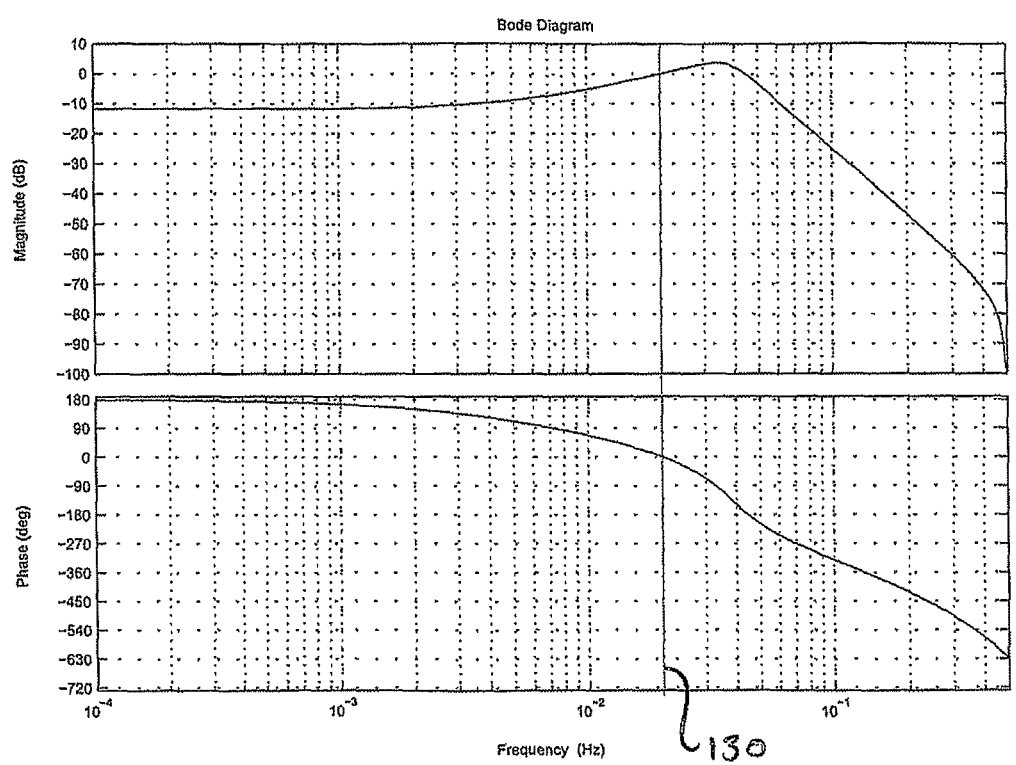
FIG. 4 is a Bode diagram illustrating the phase and amplitude errors at the primary mode resonant frequency of the apparatus of FIG. 1.

The good tracking performance at the resonant frequency is also illustrated by the Bode diagram of FIG. 4 showing the transfer from $V_{in}$ to $V_{ro}$. Both the phase and the amplitude error are small for the primary-mode resonant frequency of the gyroscope (indicated by the line 130).

Figure 5:
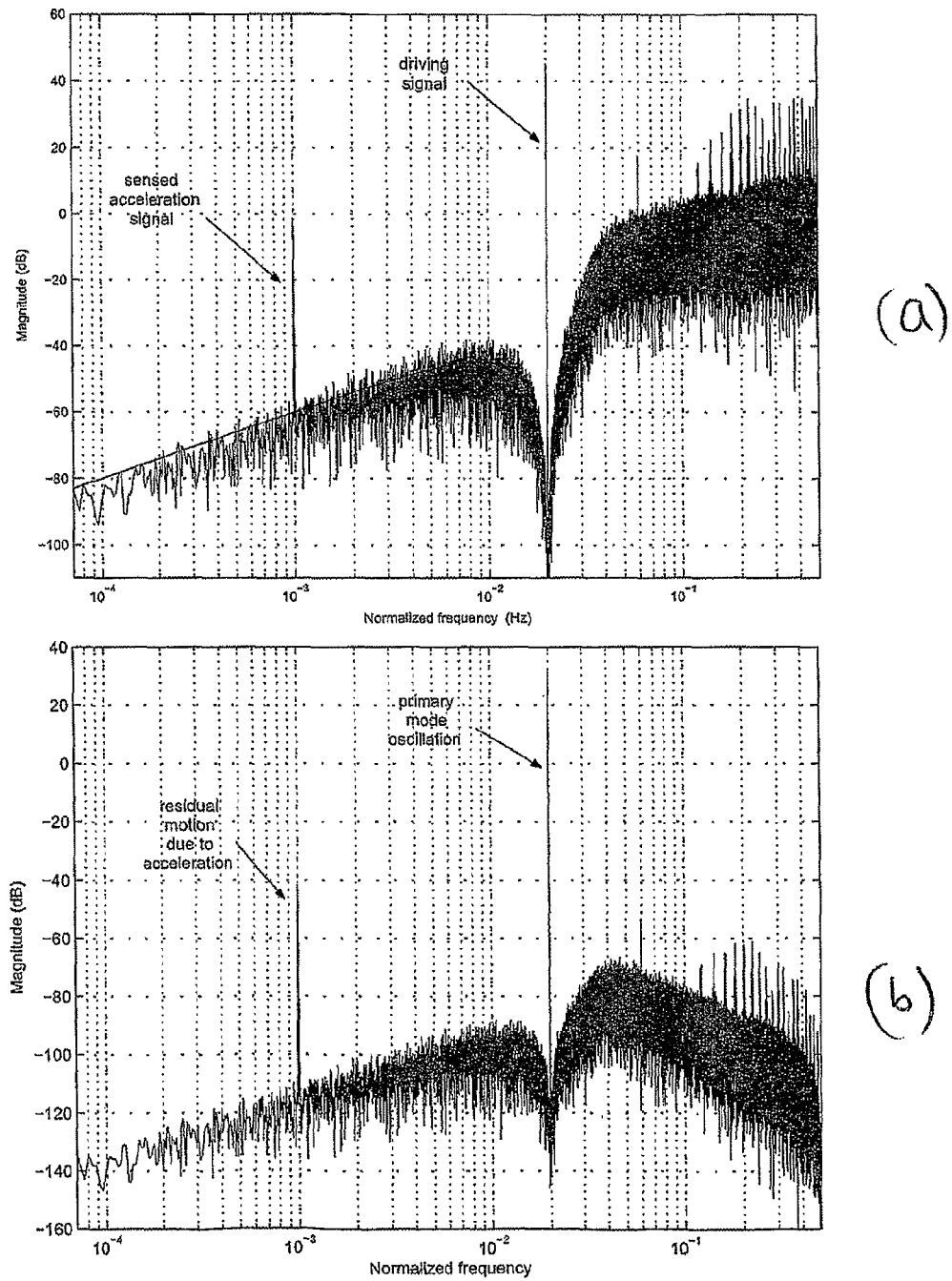
FIG. 5a shows both the spectrum of the digital output ($D_{out}$) of the $\Sigma\Delta$ force-feedback loop of the primary mode and a theoretical prediction of the shaped quantization noise.
FIG. 5b shows the spectrum of the normalised position along the primary axis ($x/x_0$) resulting from the $\Sigma\Delta$ force-feedback loop of the primary mode.

Now turning to FIG. 5, which shows spectral plots of the digital output $D_{out}$ (FIG. 5a) and the normalized movement $x/x_0$ (FIG. 5b), the large driving signal present in $D_{out}$ and the resulting response of the mechanical system is clearly noticeable. Also, the acceleration signal can be clearly identified in the digital readout. Note that the acceleration signal can also be found to some extend in the mechanical movement. This is because in this mixed-feedback architecture of $\Sigma\Delta$ force-feedback loop, the mechanical movement is only reduced and not completely cancelled. These movements are however rather small and in a frequency range substantially below the resonant frequency. Therefore, they do not interfere with the operation of the apparatus 100 as a gyroscope.

Finally, we consider the noise floor due to quantization noise. From both FIGS. 5a and 5b, it is clear that this quantization noise is pushed away from both DC and the resonant frequency. The low noise floor at both low frequencies and the resonant frequency suit the dual use of the $\Sigma\Delta$ loops 110, 120 as both an accelerometer and a gyroscope.

Turning now to FIGS. 6a-6d, the combined accelerometer and gyroscope unit 100 may be operable sense movement (FIG. 6a) or actuate movement (FIG. 6b) or both along a tertiary mode aligned with the z-axis. In this way, the unit 100 may additionally be operable to determine and/or excite acceleration along the z axis and/or rotation about the x and/or y-axes. If both actuation and sensing takes place along the z-axis, this can be achieved using a $\Sigma\Delta$ force feedback loop as described above.

Actuation and/or sensing along the z-axis can be achieved by use of comb-drive capacitors 102. Typically, there are dedicated comb-drive capacitors for each of the primary and teritatry directions [14]. In order to enable a set of comb-drive capacitors 102 to drive or sense movement along the z-axis, they are modified in the manner shown in FIG. 6c. In this alteration, one set of fingers 102a in the comb-drive capacitor 102 has a dimension h in the direction of the z-axis whilst the other set of fingers 102b has a dimension $h_r$ in the direction of the z-axis. As such, when charged the forces on the sets of fingers 102a, 102b will have components along both the x and z axes. This enables movement along the z axis to be driven by charging the comb dive fingers 102a, 102b and/or for such movement to be sensed. As is shown in FIG. 6d, the relationship between force and z axis deflection is linear for a small range about a midpoint. As can also be seen, the linear range is substantially independent of the finger 102a, 102b separation.

It is of course to be understood that the invention is not to be restricted to the details of the above embodiments which are described by way of example only.

REFERENCES

[1] M. Lemkin and B. E. Boser, "A three-axis micromachined accelerometer with a CMOS position-sense interface and digital offset-trim electronics," IEEE J. Solid-State, vol. 34, no. 4, pp. 456-468, April 1999.

[2] X. Jiang, J. I. Seeger, M. Kraft, and B. E. Boser, "A monolithic surface micromachined Z-axis gyroscope with digital output," in Symp. on VLSI Circuits Dig. Tech. Papers, Honolulu, 2000, pp. 16-19.

[3] M. Kraft, W. Redman-White, and M. E. Mokhtari, "Closed loop micro-machined sensors with higher order $\Sigma\Delta$ modulators," in Proc. 4th Conf. Modeling and Simulation of Microsystems, Hilton Head, March 2001, pp. 100-103.

[4] X. Jiang, S. A. Bhave, J. I. Seeger, R. T. Howe, and B. E. Boser, "$\Sigma\Delta$ Capacitive Interface for a Vertically-Driven X&Y-Axis Rate Gyroscope," in Proc. European Solid-State Circuits Conference (ESSCIRC), September 2002, pp. 639-642.

[5] T. Kajita, Un-Ku Moon, and G. C. Temes, "A two-chip interface for a MEMS accelerometer," IEEE Transactions on Instrumentation and Measurement, vol. 51, no. 4, pp. 853-858, August 2002.

[6] M. Kranz, S. Burgett, T. Hudson, M. Buncick, P. Ruffin, P. Ashley, and J. McKee, "A wide dynamic range silicon-on-insulator MEMS gyroscope with digital force feedback," in 12th Innational Conference on Transducers, Solid-State Sensors, Actuators and Microsystems, 2003, pp. 159-162.

[7] V. P. Petkov and B. E. Boser, "A fourth-order $\Sigma\Delta$ interface for micromachined inertial sensors," IEEE Journal of Solid-State Circuits, vol. 40, no. 8, pp. 1602-1609, August 2005.

[8] Y. Dong, M. Kraft, C. Gollasch, and W. Redman-White, "A high-performance accelerometer with a fifth-order $\Sigma\Delta$ modulator," Journal of Micromechanics and Microengineering, vol. 15, no. 7, pp. 22-29, July 2005.

[9] V. P. Petkov and B. E. Boser, "High-Order Electromechanical $\Sigma\Delta$ Modulation in Micromachined Inertial Sensors," IEEE Transactions on Circuits and Systems—I: Fundamental Theory and Applications, vol. 53, no. 5, pp. 1016-1022, May 2006.

[10] H. Külah, J. Chae, N. Yazdi, and K. Najafi, "Noise Analysis and Characterization of a Sigma-Delta Capacitive Microaccelerometer," IEEE Journal of Solid-State Circuits, vol. 41, no. 2, pp. 352-361, February 2006.

[11] J. Raman, E. Cretu, P. Rombouts, and L. Weyten, "A Digitally Controlled MEMS Gyroscope With Unconstrained Sigma-Delta Force-Feedback Architecture," in Proc. 19th IEEE Int. Conf. on Micro Electro Mechanical Systems, January 2006, pp. 710-713.

[12] J. Raman, P. Rombouts, and L. Weyten, "An Unconstrained Architecture for High-Order Sigma-Delta Force-Feedback Inertial Sensors," in ISCAS 2007, Proceedings of the 40th IEEE International Symposium on Circuits and Systems, 2007, pp. 3063-3066.

[13] S. H. Ardalan and J. J. Paulos, "An Analysis of Nonlinear Behavior in Delta-Sigma Modulators," IEEE Transactions on Circuits and Systems, vol. 34, pp. 593-603, June 1987.

[14] M. Traechtler, T. Link, J. Dehnert, J. Auber, P. Nommensen and Y. Manoli, "Novel 3-Axis Gyroscope on a Single Chip using SOI-Technology," IEEE Sensors Conference, pp. 124-127, 2007

The invention claimed is:

1. A combined accelerometer and gyroscope unit comprising:
   a proof mass;
   primary actuating means operable to actuate the proof mass along a primary axis;
   secondary actuating means operable to actuate the proof mass along a secondary axis;
   secondary sensing means operable to sense a position of the proof mass along the secondary axis; and
   primary sensing means operable to sense a position of the proof mass along the primary axis wherein $\Sigma\Delta$ force-feedback loops are set up for both the secondary axis and the primary axis wherein an input Vin is included in a primary $\Sigma\Delta$ force-feedback loop to force the proof mass to track a predefined movement.

2. A combined accelerometer and gyroscope unit as claimed in claim 1 wherein the accelerometer and gyroscope unit is a MEMS accelerometer and gyroscope unit.

3. A combined accelerometer and gyroscope unit as claimed in claim 1 wherein both the primary actuating means and the primary sensing means are comb-drive capacitors.

4. A combined accelerometer and gyroscope unit as claimed in claim 3 wherein separate comb-drive capacitors are provided for actuating and for providing a readout signal.

5. A combined accelerometer and gyroscope unit as claimed in claim 3 wherein time multiplexing is used to allow the same comb-drive capacitors to be utilised both for actuating and for providing a readout signal.

6. A combined accelerometer and gyroscope unit as claimed in claim 1 wherein both the secondary actuating means and the secondary sensing means are differential parallel plate capacitors.

7. A combined accelerometer and gyroscope unit as claimed in claim 6 wherein separate differential parallel plate capacitors are provided for actuating and for providing a readout signal.

8. A combined accelerometer and gyroscope unit as claimed in claim 6 wherein time multiplexing is used to allow the same differential parallel plate capacitors to be utilised both for actuating and for providing a readout signal.

9. A combined accelerometer and gyroscope unit as claimed in claim 1 wherein separate $\Sigma\Delta$ force-feedback loops are provided for the primary axis and the secondary axis.

10. A combined accelerometer and gyroscope unit as claimed in claim 9 wherein a primary $\Sigma\Delta$ force-feedback loop has an input Vin.

11. A combined accelerometer and gyroscope unit as claimed in claim 9 wherein each loop incorporates an electrical filter.

12. A combined accelerometer and gyroscope unit as claimed in claim 9 wherein at the end of each loop, a quantizer is provided to deliver digital output values.

13. A combined accelerometer and gyroscope unit as claimed in claim 9 wherein each loop contains a mechanical feedback path.

14. A combined accelerometer and gyroscope unit as claimed in claim 13 wherein an electrical feedback path is also provided.

15. A combined accelerometer and gyroscope unit as claimed in claim 14 wherein the feedback loops include electrical filters.

16. A combined accelerometer and gyroscope unit as claimed in claim 9 wherein each loop includes a first filter and a second filter and wherein the second filters have the same poles as the first filters.

17. A combined accelerometer and gyroscope unit as claimed in claim 15 wherein each loop includes a first filter and a second filter and wherein the second filters have different zeros to the first filters.

18. A combined accelerometer and gyroscope unit as claimed in claim 13 further including a controller filter to stabilize the loop.

19. A combined accelerometer and gyroscope unit as claimed in claim 1 wherein the unit further includes a tertiary actuating means operable to actuate the proof mass along a tertiary axis and/or tertiary sensing means operable to sense a position of the proof mass along the tertiary axis.

20. A combined accelerometer and gyroscope unit as claimed in claim 19 wherein the tertiary axis is substantially perpendicular to the plane containing the primary and secondary axes.

21. A combined accelerometer and gyroscope unit as claimed in claim 19 wherein both the tertiary actuating means and the tertiary sensing means are comb-drive capacitors.

22. A combined accelerometer and gyroscope unit as claimed in claim 21 wherein separate comb-drive capacitors are provided for actuating and for providing a readout signal.

23. A combined accelerometer and gyroscope unit as claimed in claim 22 wherein time multiplexing is used to allow the same comb-drive capacitors to be utilised both for actuating and for providing a readout signal.

24. A combined accelerometer and gyroscope unit as claimed in claim 23 wherein two sets of fingers comprising the comb-drive capacitors are of differing dimensions along the tertiary axis.

25. A combined accelerometer and gyroscope unit as claimed in claim 1 wherein the unit is operated in a mode wherein a $\Sigma\Delta$ force-feedback loop is set up for only one of the secondary axis and the primary axis.

26. A sensor cluster comprising one or more combined accelerometer and gyroscope units according to claim 1.

27. A sensor cluster as claimed in claim 26 wherein the cluster includes one or more dedicated single axis or multi-axis accelerometers and/or one or more dedicated single axis or multi-axis gyroscopes.

28. A method of operating a combined accelerometer and gyroscope unit having a proof mass; primary actuating means operable to actuate the proof mass along a primary axis; secondary actuating means operable to actuate the proof mass along a secondary axis; secondary sensing means operable to sense a position of the proof mass along the secondary axis; and primary sensing means operable to sense a position of the proof mass along the primary axis, the method comprising the steps of: setting up ΣΔ force-feedback loops for the both the secondary axis and the primary axis to measure both a component of rotation and two components of acceleration wherein an input Vin is included in a primary ΣΔ force-feedback loop to force the proof mass to track a predefined movement.

29. A method as claimed in claim 28 both the primary actuating means and the primary sensing means include comb-drive capacitors.

\* \* \* \* \*